US006841239B2

(12) United States Patent
Hasegawa

(10) Patent No.: US 6,841,239 B2
(45) Date of Patent: Jan. 11, 2005

(54) COMPOSITE WOOD AND MANUFACTURING METHOD THEREOF

(76) Inventor: Katuyuki Hasegawa, 4652-4, Funatumachi, Himeji-shi, Hyogo 679-2101 (JP)

( * ) Notice: Subject to any disclaimer, the term of this patent is extended or adjusted under 35 U.S.C. 154(b) by 0 days.

(21) Appl. No.: 10/256,211

(22) Filed: Sep. 27, 2002

(65) Prior Publication Data

US 2003/0064238 A1 Apr. 3, 2003

(30) Foreign Application Priority Data

| | | |
|---|---|---|
| Sep. 28, 2001 | (JP) | 2001-300428 |
| Sep. 28, 2001 | (JP) | 2001-300442 |
| Mar. 28, 2002 | (JP) | 2002-090752 |
| Mar. 28, 2002 | (JP) | 2002-090753 |

(51) Int. Cl.[7] .......... B32B 5/16

(52) U.S. Cl. .......... 428/323; 428/326; 428/402; 428/532; 428/535; 428/536; 428/537.1; 523/222; 521/13; 521/14; 521/53.1

(58) Field of Search .......... 428/323, 326, 428/402, 532, 535, 536, 537.1; 523/222; 521/13, 14, 53.1

(56) References Cited

U.S. PATENT DOCUMENTS 6,638,612 B2 * 10/2003 Jones .......... 428/323

FOREIGN PATENT DOCUMENTS

| | | | |
|---|---|---|---|
| JP | 58-217552 | A | 12/1983 |
| JP | 59-1304 | B | 1/1984 |
| JP | 59-2455 | B | 1/1984 |
| JP | 59-217744 | A | 12/1984 |
| JP | 61-155436 | A | 7/1986 |
| JP | 3-64553 | B | 10/1991 |
| JP | 10-71636 | A | 3/1998 |

* cited by examiner

*Primary Examiner*—Leszek Kiliman
(74) *Attorney, Agent, or Firm*—Smith Patent Office

(57) ABSTRACT

A manufacturing method of composite wood that arbitrary amount of wood can be used, nailing is possible and a product with arbitrary configuration is easily manufactured is provided.

A melted binder resin and a plurality of wood pieces are kneaded. Then, a resultant kneaded material of the wood pieces and the binder resin is strongly pressed. The binder resin is cooled while the kneaded material is strongly pressed. Alternatively, strong pressing and cooling are repeated for the kneaded material. As a result, the binder resin is cured. A resultant composite wood is cut into a board with a predetermined thickness or a bar with a predetermined dimension and assembled into a desired product. A water content of the wood pieces may be evaporated by heat from the binder resin or may be evaporated by heating the wood pieces.

12 Claims, 7 Drawing Sheets

20kV X100 300um

COMPOSITE WOOD AND MANUFACTURING METHOD THEREOF

BACKGROUND OF THE INVENTION

1. Field of the Invention

The present invention relates to a composite wood and a manufacturing method thereof. In particular, the present invention relates to a composite wood which has excellent characteristics similar to wood such as workability, excellent characteristics similar to synthetic resin such as water resistance and predetermined mechanical strength, and a manufacturing method thereof.

2. Discussion of the Related Art

Recently, environmental issues have been attracting attention. Especially, global warming due to carbon dioxide has being realized. Forest destruction caused by cutting trees has become a serious problem. In general, a cut tree is dried and lumbered. Then, the lumbered tree is worked in a shape or a configuration depending on various applications. In this way, lumber is obtained. Nevertheless, in most cases, the lumber is finally incinerated and is not effectively utilized.

On the other hand, generally available polyolefin-based thermoplastic resins such as polyethylene or polypropylene exhibit lipophilic properties and inferior wettability with respect to hydrophilic wood, pulp, paper, sawdust or the like. For this reason, these materials cannot be successfully mixed together. Even if these materials are forcibly mixed, the binding force between them is weak. Thus, it is difficult to manufacture a composite wood.

Various methods of manufacturing composite material such as fiber board, particle board, wood block or the like by using wood material and a thermoplastic resin such as a phenol resin or an epoxy resin have been proposed. Nevertheless, as these methods use the thermoplastic resin, costs are increased.

There has been proposed a method of crushing discarded wood, thinned wood or wood waste into wood powder, kneading the wood powder and melted polyolefin-based discarded plastic, extruding the kneaded material and forming the same. In this way, a product is manufactured and resources can be effectively utilized.

Japanese Examined Patent Publication No. S59(1984)-1304

Japanese Unexamined Patent Publication No. S58(1983)-217552

Japanese Examined Patent Publication No. S59(1984)-2455

Japanese Unexamined Patent Publication No. S59(1984)-217744

Japanese Examined Patent Publication No. H3(1991)-64553

Japanese Unexamined Patent Publication No. S61(1986)-155436

Japanese Unexamined Patent Publication No. H10(1998)-71636

In accordance with the above-described method using the wood powder, the wood powder must be dried so as to have a predetermined amount of water content, e.g., 10% or less of the water content in order to ensure mechanical characteristics of composite wood. Thus, the manufacturing process is complicated.

If an amount of the wood powder is increased, the wood powder cannot be successfully kneaded with a melted resin. Actually, the amount of the wood powder is about the same as an amount of synthetic resin in volume ratio.

Although the wood powder is used for composite material, the composite material actually exhibits characteristics similar to a synthetic resin. Nailing, cutting by a saw, and adhesion using a water soluble adhesive are difficult. Further, applications for products which can be applied to the composite material are restricted.

SUMMARY OF THE INVENTION

In view of the aforementioned drawbacks, an object of the present invention is to provide a manufacturing method of composite wood which has excellent characteristics similar to wood such as workability, excellent characteristics similar to synthetic resin such as water resistance and a predetermined mechanical strength.

In accordance with a composite wood of the present invention which is manufactured by binding a plurality of wood pieces together by a binder resin, wherein each of the plurality of wood pieces has a three-dimensional configuration that a plurality of small cavities substantially remain in three directions, the entire three dimensional configuration or most of the three-dimensional configuration of each of the plurality of wood pieces is surrounded by the binder resin with the small cavities adjacent to a surface side being deformed so as to be collapsed, the binder resin enters into the small cavities at the surface side of each of the plurality of wood pieces so that the plurality of wood pieces are bound to the binder resin.

In accordance with an aspect of the present invention, a plurality of wood pieces each of which has a configuration such that a plurality of small cavities substantially remain are bound together by a binder resin after being strongly pressed together.

Since a plurality of wood pieces are surrounded by the binder resin and isolated from each other, heat insulating efficiency is high. Further, even if water enters into the wood pieces exposed at a surface, the water remains adjacent to the wood pieces and does not enter into other wood pieces. Thus, a composite wood exhibits excellent water resistance.

Each of the surfaces of a plurality of wood pieces is deformed by pressing the binder resin such that small cavities at the surface are collapsed. Further, the binder resin enters into such small cavities at the surface. Thus, the wood pieces are strongly bound to the binder resin. For example, the wood piece having good hydrophilic properties can be strongly bound to the binder resin. The binder resin has lipophilic properties and can be a material such as an olefin-based resin. Accordingly, even if the wood pieces are exposed at the surface of the composite wood, the wood pieces are not easily peeled. Thus, a high quality product using the composite wood can be insured.

Moreover, as a plurality of wood pieces are dispersed and bound together by the binder resin, the composite wood exhibits characteristics similar to wood. Nailing for the composite wood can be easily performed, and the composite wood can be planed by a planer. Because the characteristics of the composite wood do not have an orientation, the composite wood can be cut by a saw at any portion thereof in any direction. Further, as the wood pieces are exposed at the surface of the composite wood, adhesion by a water soluble adhesive can be performed utilizing such wood pieces.

The amount of the wood piece can be freely set. Thus, if the amount of the wood piece is large and the wood pieces are bound by the binder resin while dispersed, the composite wood exhibits high mechanical strength such as tensile strength and flexural strength. As a result, the composite wood exhibits, in addition to the aforementioned heat insulating properties and water resistance, characteristics similar to wood, characteristics similar to synthetic resin and high mechanical strength. Consequently, the composite wood can be utilized for any application including construction material such as a form, core material for furniture such as a pole or a wall, material for transportation such as a pallet and an outdoor product such as a bench.

For example, if natural wood is used for the material for transportation such as a pallet, fumigation or thermal treatment for exterminating harmful insects such as pine bark beetles is required in order to prevent damage to the forest in the receiving country. As a result, manufacturing costs are increased. In accordance with the present invention, the composite wood includes a plurality of wood pieces that are dispersed in a synthetic resin and therefore, the fumigation or the thermal treatment for exterminating harmful insects is not required. Further, even if the material for transportation, such as a pallet, is manufactured by using the composite wood, cost increases due to extermination of harmful insects do not occur.

Each of the wood pieces is surrounded by a binder resin and the wood pieces are isolated from each other. Thus, even if harmful insects such as pine bark beetles are attached to wood pieces at the surface of the composite wood during its usage, the harmful insects do not enter into the composite wood.

If the wood piece is crushed by a crushing machine, fine split portions are formed at fiber direction end portions of the wood piece. Because of such fine split portions, the wood piece can be even further strongly bound to the binder resin.

A plurality of fine split portions are formed at a part of the surface of the wood piece and a binder resin enters between a plurality of fine split portions. A plurality of fine split portions are deformed in a direction of being close together, so that a plurality of wood pieces and the binder resin are even further strongly bound together.

The wood piece refers to a wood piece which has a three-dimensional configuration where a plurality of small cavities substantially remain in three directions. In accordance with the present invention, the wood piece refers to a wood piece of 2 mm or larger when measured by a comb tooth of a crushing machine. A wood powder refers to a wood powder of 2 mm or smaller when measured by a comb tooth of a crushing machine or a milling machine. Further, a sliced thin piece of wood refers to as a sliced piece which has a planar configuration where a plurality of small cavities substantially remain only in two directions of three directions.

The wood pieces are distinguished from the wood powder. The small cavities in the wood powder and in the sliced thin pieces of wood do not maintain their three dimensional shape. The wood pieces have a three-dimensional configuration having a plurality of small cavities that maintain their three dimensional shape. A small cavity in the wood pieces mainly refers to a cell cavity formed by a cell wall. The small cavity may include a conduit cavity or a capillary cavity. The wood piece is distinguished from the wood powder and the sliced thin piece of wood from such a point of view.

When discarded wood is crushed, wood pieces and wood powders with various sizes are usually generated. Accordingly, a plurality of wood pieces may have a unique size. Nevertheless, a plurality of wood pieces with various sizes are preferably used in order to omit a selection step.

The wood powder of 2 mm or smaller when measured by a comb tooth of a crushing machine and sliced thin pieces of wood with a three-dimensional configuration having a plurality of small cavities that substantially remain only in two of the three directions may be dispersed between a plurality of wood pieces.

As described above, a high binding strength of the binder resin and the wood pieces can be ensured. Thus, the amount of wood pieces may be freely set relative to the amount of the binder resin. In actuality, the amount of wood pieces is preferably one to five times larger than the amount of the binder resin in a volume ratio.

The binder resin may be any resin and for example, widely available polypropylene, polyethylene, polyvinyl chloride and other thermoplastic resins may be used.

The wood pieces may be obtained from new wood. In view of effectively utilizing wood resources, however, wood pieces made of discarded wood are preferably used.

New resin may be used for the thermoplastic resin. In view of effectively utilizing resources, however, a resin made of discarded plastic is preferably used.

The composite wood of the present invention which has been used for an application may be discarded as in conventional cases. If a used composite wood is heated, the thermoplastic resin is softened and melted, and the composite wood returns to the condition it was when the wood pieces and the thermoplastic resin were kneaded. Thus, the composite wood of the present invention has excellent recycling properties and can be reused again.

Crushed pieces of used composite wood or parts of them may be partially or entirely used again as a plurality of wood pieces and combined with a thermoplastic resin.

In accordance with a manufacturing method for making composite wood according to the present invention, a plurality of wood pieces, each of which has a three-dimensional configuration having a plurality of small cavities which substantially remain in three directions, are entirely dispersed and bound together by a binder resin. They are then air cooled and strongly pressed in at least one direction of three directions so that each of the plurality of wood pieces with small cavities is surrounded by the binder resin. The small cavities are adjacent to a surface of the three-dimensional configuration or most of the three-dimensional configuration of each of the plurality of wood pieces. The small cavities are deformed so as to be collapsed when pressed and the binder resin enters into the small cavities. Therefore, the plurality of wood pieces and the binder resin are bound together. The manufacturing method comprises the steps of: heating the wood pieces such that a water content of the wood pieces is evaporated, melting the binder resin and kneading the melted binder resin and the plurality of wood pieces, pressing a kneaded material of the wood pieces and the binder resin in one to three directions, and cooling the kneaded material while maintaining a strongly pressed state or repeating the strong pressing and cooling such that the binder resin is cured.

In accordance with an aspect of the present invention, a plurality of wood pieces are kneaded with a binder resin. Each of the wood pieces has a three-dimensional configuration where a plurality of small cavities substantially remain. Then, a resultant kneaded material is strongly pressed in one, two or three directions, and cooled in this state. Thus, the binder resin is cured.

Each of the plurality of wood pieces is surrounded by the binder resin in a state that small cavities at a surface are deformed so as to be collapsed. The binder resin enters into the small cavities adjacent to the surface of each of the wood pieces. Thus, a plurality of wood pieces is strongly bound to the binder resin. As a result, a composite wood can be manufactured, which has good heat insulating properties, water resistance, characteristics similar to wood, characteristics similar to synthetic resin, high mechanical strength including high tensile strength and flexural strength.

Strong pressing of the kneaded material of the wood pieces and the binder resin in three directions refers to a case of charging the kneaded material into a mold with its one surface being open and strongly pressing the mold by a pressure plate from a direction of the open surface. Strong pressing is distinguished from ordinary die molding in that a pressure which is equal to or larger than the clamping force is applied.

Strong pressing of the kneaded material in a direction refers to the case of extruding the kneaded material in a plate shape from a kneading machine (the kneaded material may be moved from the kneading machine to an extruder and then extruded) and strongly pressing the plate-shaped kneaded material by rollers. Strong pressing in two directions refers to the case of pressing by a longitudinal roller and a transverse roller (instead of the longitudinal roller, die portions may be provided at opposite sides of the transverse roller and the kneaded material may be pressed by the die portions provided at the opposite sides with strong pressure of the transverse roller so as to obtain strong pressure from a transverse direction).

When the kneaded material is pressed in three directions, a molding die or a pressure plate is cooled by water and the kneaded material is cooled in a state of being strongly pressed. Nevertheless, when the kneaded material is pressed in two directions or one direction, the method which is utilized in a case of pressing in three directions cannot be used. Then, various methods for cases of pressing in two directions or one direction are studied and experiments are repeated. As a result, it was found that the same results can be obtained by using a method of repeating strong pressing and cooling.

A water content of the wood pieces may be evaporated by other heat sources prior to kneading with a melted binder. Alternatively, the wood pieces may be heated by heat from the binder resin when a melted resin and a plurality of wood pieces are kneaded in order to evaporate the water content of the wood pieces. Consequently, a step for drying the wood pieces is not separately required and a manufacturing process can be simplified.

When a used composite wood is reused, a recycled composite wood is crushed into pieces such that the three-dimensional configuration of each of the pieces remains, for example, each of the pieces has a side dimension of 25 to 35 mm. Then, the pieces are heated by an appropriate heat source such that the thermoplastic resin is melted. If it is necessary, a thermoplastic resin is added and a resultant material may be used as a kneaded material of the wood pieces and thermoplastic resin or a part of the same.

An appropriate ratio of wood pieces to thermoplastic resin needs to be maintained when used composite wood is recycled.

DETAILED DESCRIPTION OF THE PREFERRED EMBODIMENTS

Figure 1:
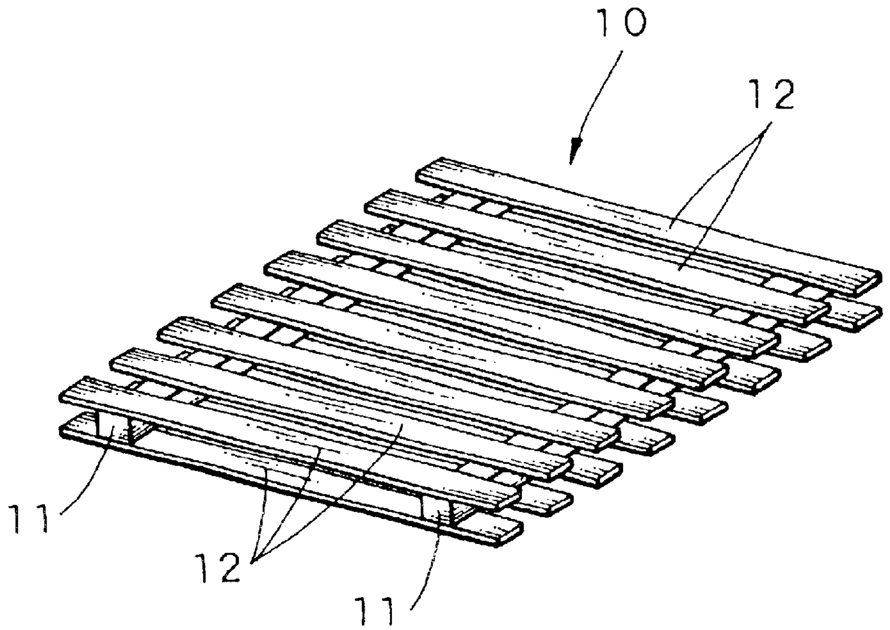
FIG. 1 is a schematic perspective view showing a pallet using a composite wood manufactured by a preferred embodiment of the present invention.

Hereinafter, the present invention will be described in detail on a basis of embodiments shown in the drawings. FIGS. 1 through 6 show a preferred embodiment of composite wood relating to the present invention. The preferred embodiment shows an example of applying the present invention to a pallet for transportation. Referring to the drawings, a pallet 10 is manufactured such that a plurality of boards 12 are arranged, passed across between two squared timbers 11 so as to nip the squared timbers and be fixed to the squared timbers 11 by nails.

Figure 2:
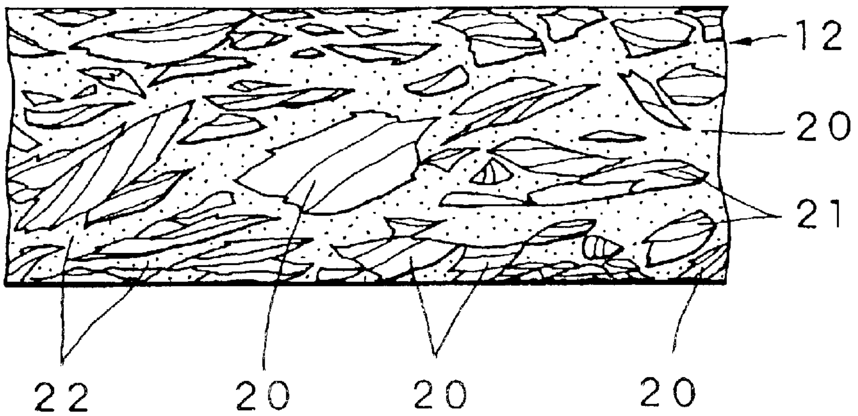
FIG. 2 is a partially cross-sectional view of the composite wood.
Figure 3:
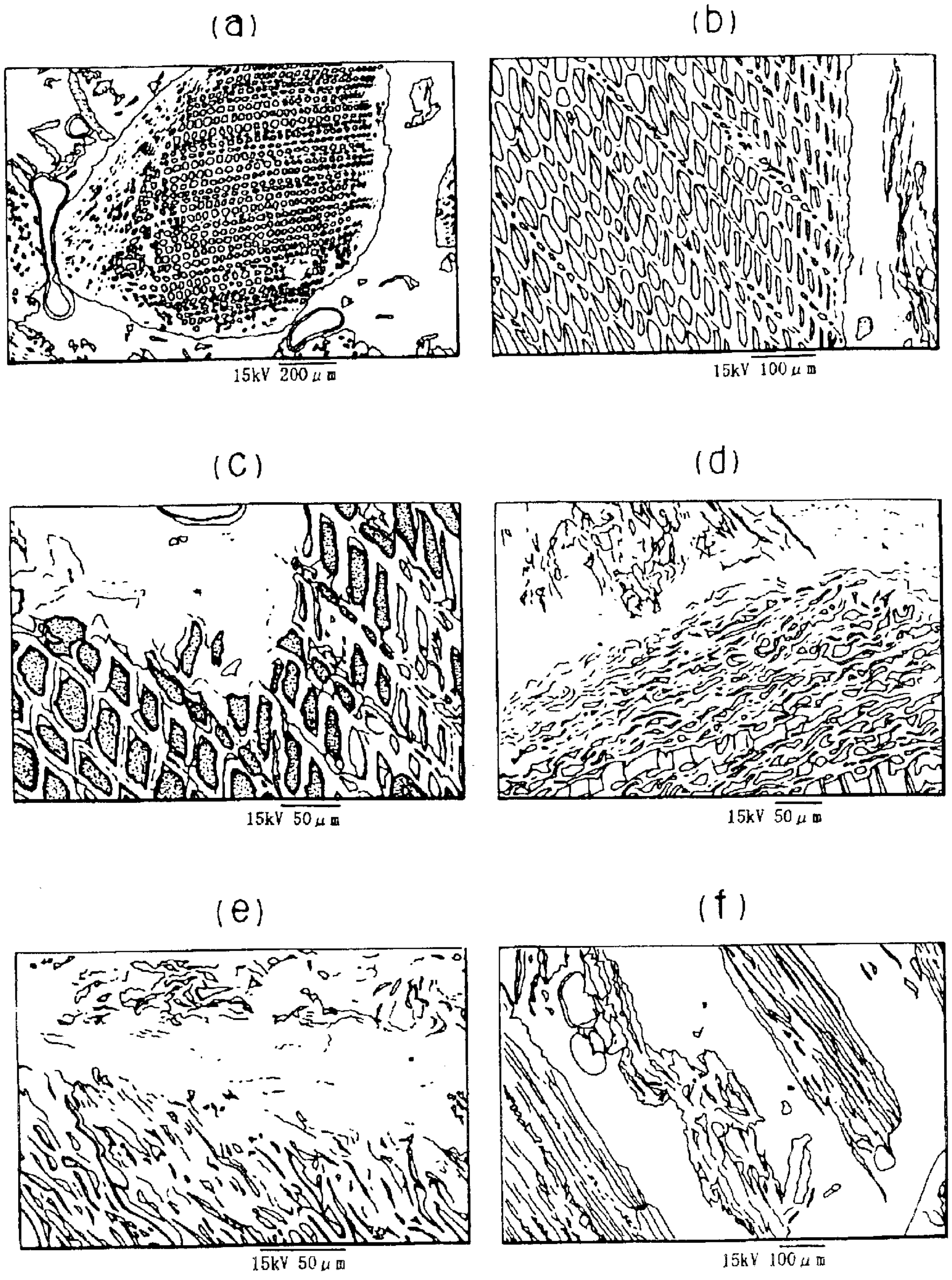
FIGS. 3A through 3F are photomicrographs of the composite wood.

A composite wood of this embodiment is used as the material for the squared timber 11 and the board 12. As shown in FIG. 2, the composite wood is manufactured such that a large number of wood pieces 20 are substantially wholly dispersed and bound together by a binder resin 21 while being strongly pressed in three directions.

The wood pieces 20 are made of discarded wood or thinned wood. The wood pieces 20 include cell walls. The wood pieces 20 have a dimension of 2 mm or larger when measured by a comb tooth of a crushing machine, i.e., a dimension so as to have a three-dimensional configuration having cell walls with a plurality of small cavities therein, the plurality of small cavities substantially remain in three directions. An appropriate amount of wood powder 22 with a size of 2 mm or smaller is dispersed between the wood pieces 20. The wood pieces may be equal to or larger than 2 mm and may be appropriately selected depending on the material for the wood pieces, the crushing method or the application of the composite wood. Alternatively, sliced thin wood pieces may be dispersed instead of the wood powder or together with the wood powder.

A thermoplastic resin made of discarded plastic (or new plastic) such as polypropylene, polyethylene or polyvinyl chloride is used for the binder resin 21. A plurality of types of resins with close melting points may be mixed. In view of the deterioration of resins due to a difference between the melting points and their variation of characteristics, a single thermoplastic resin is preferably used.

An amount of wood pieces 20 is one time to five times, e.g., 4.5 times larger in volume ratio than that of the binder resin 21. The amount of the wood pieces 20 is appropriately selected depending on the application for the composite wood. In this case, the amount may be less than an amount of the binder resin 21 or may be five times larger than the amount of the binder resin 21. For example, when the characteristics of the binder resin 21 are mainly utilized, the amount of the wood pieces 20 is equal to or less than that of the binder resin 21. When the characteristics of the wood pieces are mainly utilized, the amount of the wood pieces 20 is twice or more than that of the binder resin 21. The amount of the wood pieces 20 may be appropriately selected depending on the application.

As shown in FIGS. 3A and 3B, each of a plurality of wood pieces 20 embedded within the binder resin 21 adjacent to the surface, is surrounded by the binder resin 21 with small cavities at the surface being deformed in a direction of being collapsed. Further, the binder resin 21 enters into the small cavities at the surface of the wood pieces 20. The entered binder resin acts as an anchor, so that the wood pieces 20 are strongly bound to the binder resin 21.

Most of the surface (resin side portion) of each of the plurality of wood pieces 20 exposed at a surface of the binder resin 21 is, as shown in FIGS. 3C, 3D and 3E, surrounded by the binder resin 21 with small cavities at the surface being deformed in a direction of collapsed. Further, the binder resin 21 enters into the small cavities which are adjacent to the surface (resin side) of each of the plurality of wood pieces 20, so that the wood pieces 20 are strongly bound to the binder resin 21. On the other hand, the small cavities are exposed at the surface of each of the wood pieces 20 on the opposite side of the resin, and thus a water soluble adhesive can easily enter into the small cavities.

When fine split portions are formed at fiber direction end portions of the wood pieces 20, as shown in FIG. 3F, the binder resin 21 enters between a plurality of fine split portions and the plurality of fine split portions are deformed in a direction of being closer to each other. Thus, the wood pieces 20 are further strongly bound to the binder resin 21.

Figure 4:
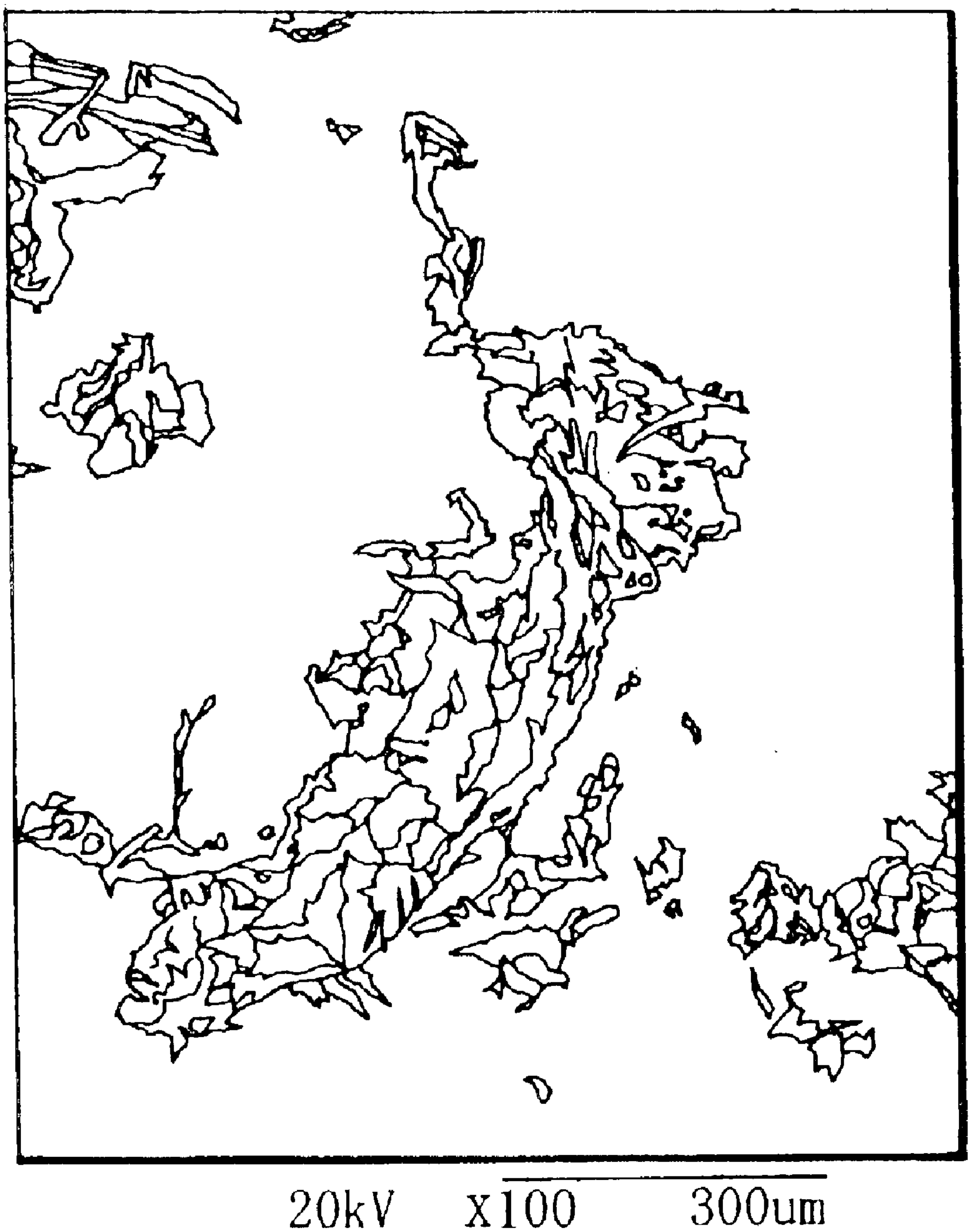
FIG. 4 is a photomicrograph of wood powder.

FIG. 4 shows a three-dimensional configuration of wood powder for reference. Referring to the wood powder, it can be seen that small cavities hardly remain.

Figure 5:
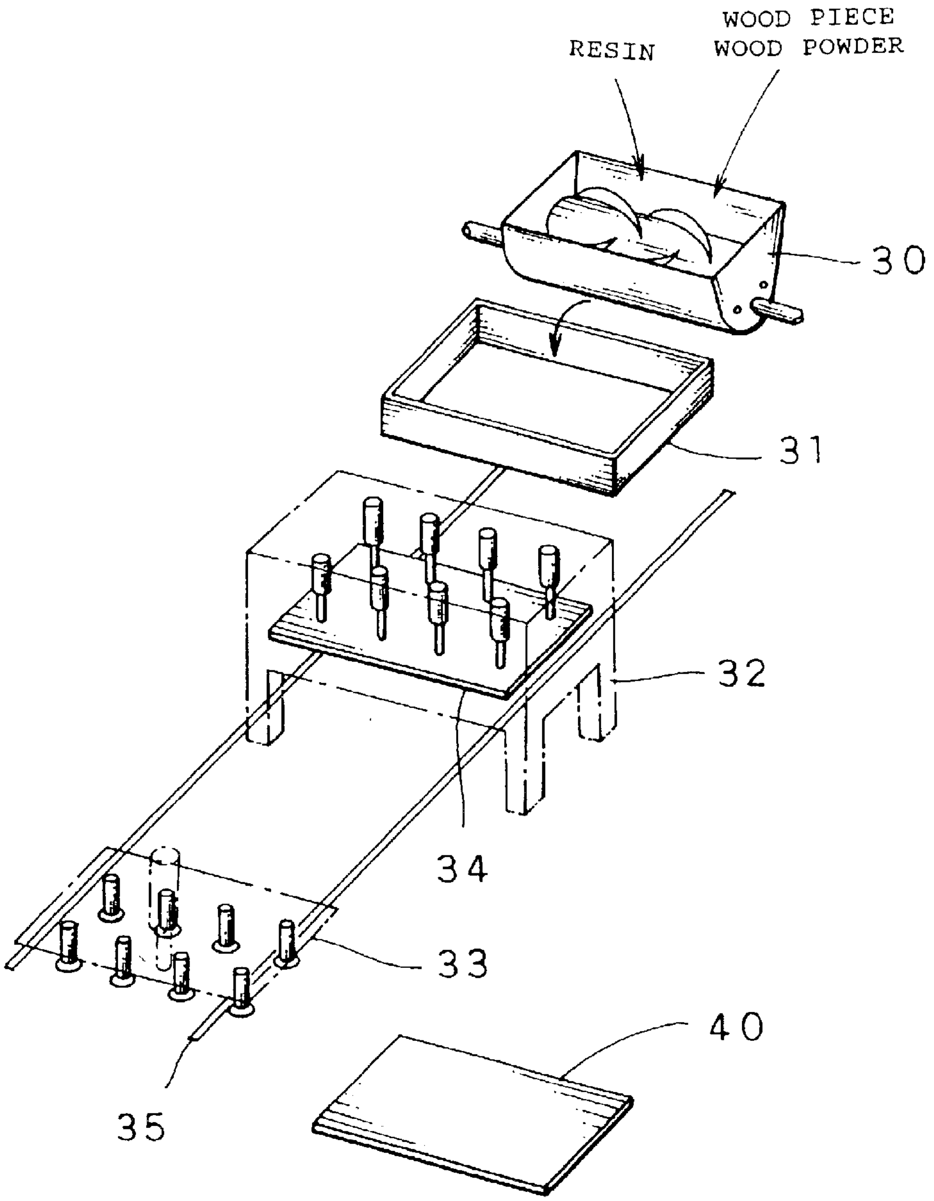
FIG. 5 is a schematic view conceptually showing a manufacturing method of the first embodiment.

Next, a manufacturing method will be described with reference to FIGS. 5 and 6. In order to manufacture a composite wood of this embodiment, discarded wood or thinned wood is crushed into chips of 2 mm or larger measured by a comb tooth of a crushing machine and then a material that contains a large amount of wood pieces 20 mixed with a small amount of wood powder 22 is prepared. A binder resin 21 made of discarded plastic, e.g., polypropylene, polyethylene or polyvinyl chloride is crushed by a crushing machine into chips with an appropriate size. A single binder resin may be used or a plurality of types of binder resins may be mixed.

A heater of a kneading machine 30 is operated and an interior of the kneading machine 30 is increased to a melting temperature of the binder resin 21, e.g., a range of 100° C. to 300° C. Then, crushed chips of the binder resin 21 are charged into the kneading machine 30 and melted while being stirred. The binder resin chips may be charged at a time or may be charged at a several times (step S10 in FIG. 6).

If heat is generated during melting of the binder resin 21 because of stirring of the melted resin by rotation of stirring blades, a heating temperature of the heater may be lower than a melting temperature of the binder resin 21.

When the binder resin 21 is thoroughly melted, prepared wood pieces 20 and wood powder 22 are charged into the kneading machine 30 at a particular time or several times. Then, the mixture is kneaded such that the melted binder resin 21 reliably coats the surfaces of the wood pieces 20 and the wood powder 22 (step S11 in FIG. 6).

If a large amount of wood pieces 20 and wood powder 22 is charged at a time, the temperature of the melted resin may decrease. Thus, the wood pieces 20 and the wood powder 22 are preferably heated in advance to an appropriate temperature by a heater or the like.

If the binder resin 21 is heated for a long period of time in a melted condition, the original characteristics of the resin may deteriorate. Thus, the binder resin 21 is preferably thoroughly melted and then kneaded in a short period of time. In accordance with the experiments of the present inventors, it was found that the time required for melting and kneading is preferably in the range of 5 to 30 minutes.

At the time of kneading, the wood pieces 20 and the wood powder 22 are heated to 100° C.–300° C. by the heat generated from the melted resin. Thus the water content contained in the wood pieces 20 and the wood powder 22 is evaporated and diffused from an opening in the kneading machine 30. Thus, the water content of the wood pieces 20 and the wood powder 22 is significantly decreased. When the kneading machine 30 is a sealed type, the kneading machine 30 must be opened for a certain period of time such that vapor is diffused.

As the wood pieces 20 and the wood powder 22 are heated by heat from the melted resin, harmful insects and their eggs contained in the wood pieces 20 and the wood powder 22 can be killed.

Figure 6:
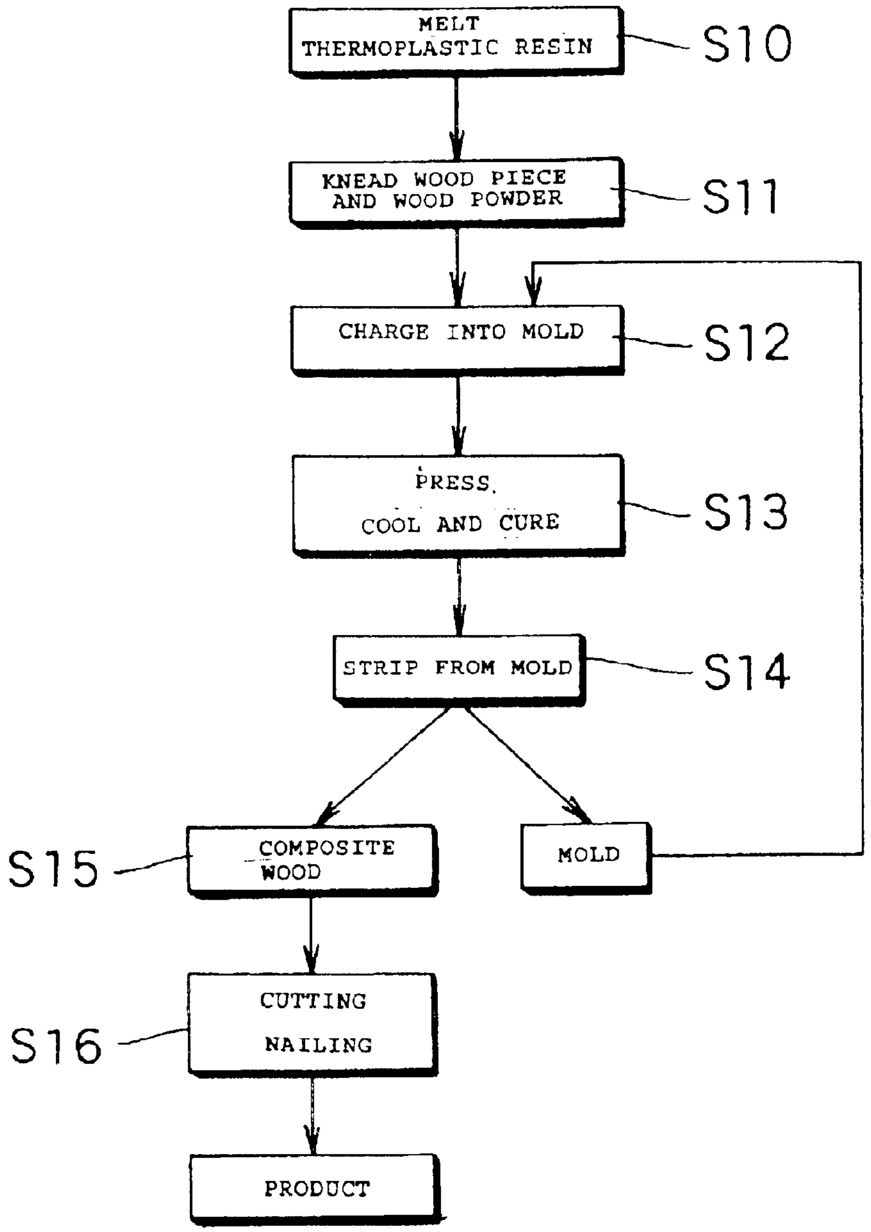
FIG. 6 is a process drawing showing a manufacturing process of the first embodiment.

When the wood pieces 20, the wood powder 22 and the melted binder resin 21 are kneaded thoroughly, molding drag 31 is set under the kneading machine 30 and the kneaded material within the kneading machine 30 is charged into the drag 31 (step S12 in FIG. 6).

The drag 31 is moved to a press machine 32 by rails 35. The kneaded material within the drag 31 is strongly pressed from upward by a cope 34 which is set in the press machine 32 to a pressure which is larger than a pressure at a time of clamping of the resin in an ordinary molding, cooled in a pressed condition and cured (step S13 in FIG. 6). When cooling is performed, the drag 31 and the cope 34 are provided with a water cooling jacket. Then, the kneaded material is preferably cooled by water in a state of being strongly pressed.

The press machine 32 is structured such that the cope 34 is moved downward by a plurality of hydraulic cylinders or air cylinders and each of the cylinders applies a surface pressure of $19.6\times10^{-5}$ Pa (20 kgf/cm$^2$). The surface pressure may be appropriately set to around $58.8\times10^{-5}$ Pa (60 kgf/cm$^2$) depending on the applications or materials for the composite wood. A surface pressure larger than $58.8\times10^{-5}$ Pa (60 kgf/cm$^2$) may be applied if desired.

When a predetermined period of time elapses and the kneaded material is sufficiently cured, the cope 34 is moved upward, the drag 31 is moved to a stripping machine 33 and a block or board shaped composite wood 40 with a predetermined dimension within the drag 31 is taken by utilizing a vacuum (step S114 in FIG. 6). The drag 31 is returned to the kneading maching 30.

The block or board shaped composite wood 40 is cut by a saw into a board with a predetermined thickness or a squared timber with a predetermined dimension. By nailing these boards and squared timbers, the pallet 10 made of composite wood shown in FIG. 1 can be manufactured.

When the used pallet 10 or another product made of the composite wood is recycled and reused, the recycled pallet 10 is crushed by a crushing machine or a milling machine into chips of around 30 mm measured by a comb tooth. The crushed chips are charged into the kneading machine 30, wood pieces and a binder resin are also charged therein if necessary and the binder resin is melted by a heater of the kneading machine 30. As a result, a kneaded material made of wood pieces, wood powder and binder resin is obtained. Then, as described above, a new block or board shaped composite wood can be manufactured.

In accordance with the composite wood of this embodiment, because a large number of wood pieces 20 are surrounded by the binder resin 21 and isolated with each other, thermal insulating efficiency is high. Further, even if water permeates into the wood pieces 20 which are exposed at a surface of the composite wood, the water content remains at the wood pieces 20 and does not permeate into the inner wood pieces 20. Thus, the composite wood has, as a whole, a superior water resistance.

In accordance with a water absorption test for water with an ordinary temperature and boiling water performed by the present inventors, an average water absorption of water with an ordinary temperature with respect to natural wood is 1.5 to 2.7%. On the other hand, the average water absorption of the water with the ordinary temperature with respect to the composite wood of this embodiment is equal to or less than 0.6%. An average water absorption of boiling water with respect to the composite wood of this embodiment is equal to or less than 2.3%. Compared to the natural wood, the composite wood of this embodiment hardly absorbs water and variation in dimension caused by water absorption does not occur.

In accordance with the present inventors' research of characteristics similar to wood, the following points are confirmed. Namely, nails can be easily entered into the composite wood and the composite wood can be planed by a planar. Any portions of the composite wood can be cut by a saw in any directions. Further, the composite wood can be adhered by a water soluble adhesive.

In accordance with research about a mechanical strength of the composite wood by the present inventors, it is confirmed that the composite wood exhibits higher mechanical strength such as higher tensile strength and higher flexural strength than ordinary wood.

Figure 7:
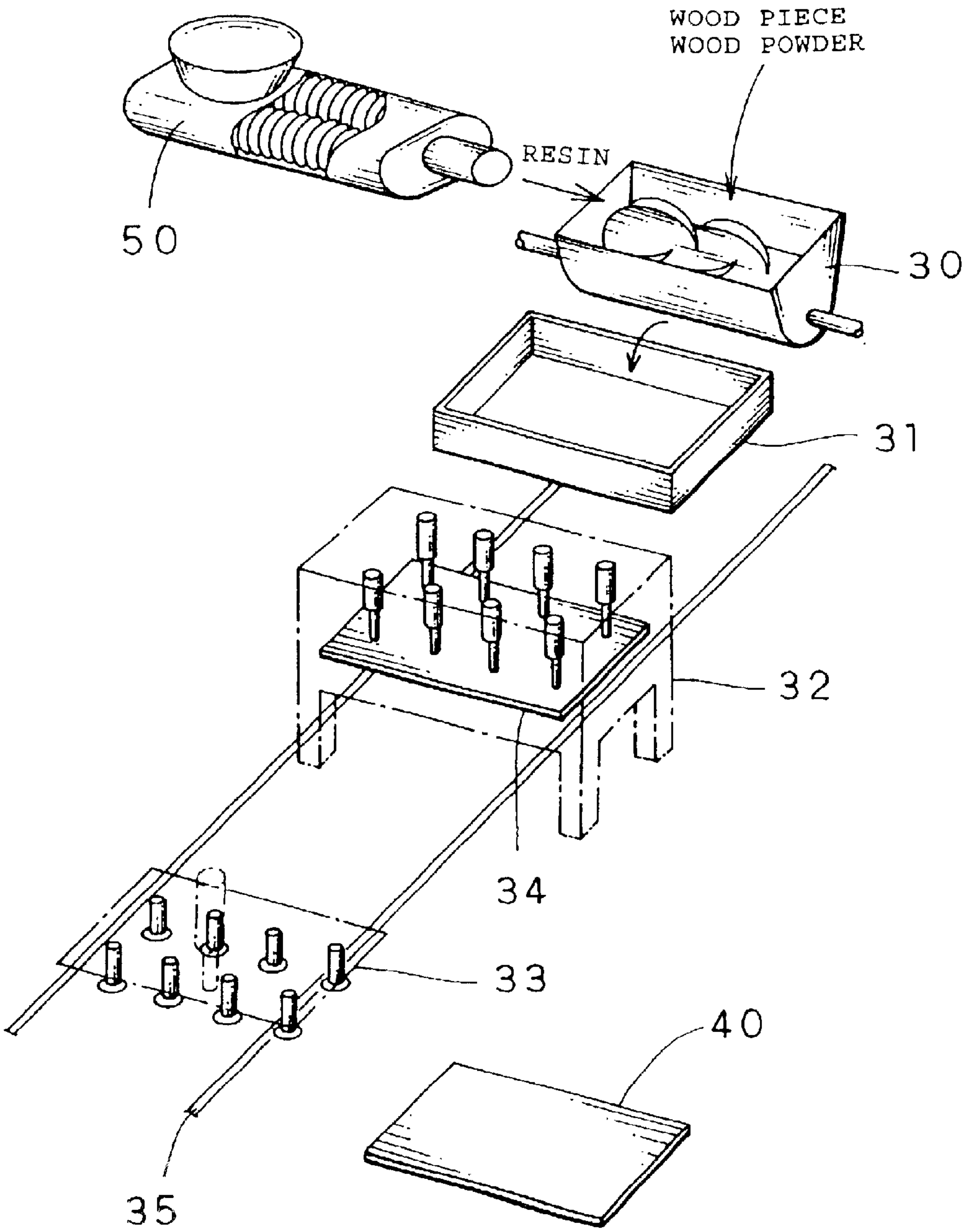
FIG. 7 is a schematic view conceptually showing a manufacturing method of a second embodiment.

FIG. 7 shows a second embodiment. Referring to FIG. 7, the same portions as those of FIG. 5 are denoted by the same reference numerals. In accordance with the second embodiment, a biaxial heating and extruding machine 50 is provided (uniaxial pressing and extruding machine may be used). When the chips of the binder resin are charged into an opening of the biaxial heating and extruding machine 50, the chips of the binder resin are heated by a built-in heater and conveyed forward while being kneaded by two screws. For this reason, a temperature of the resin binder is further increased. As a result, thoroughly melted binder is outputted from an exit.

When a composite wood is manufactured by using a system of this embodiment, wood pieces and wood powder are charged into the kneading machine 30 at one time or at several times. The wood pieces and the wood powder are heated by a heater of the kneading machine 30 such that the water content thereof is thoroughly evaporated. On the other hand, chips of the binder resin are charged into the biaxial heating and extruding machine 50 and the binder resin is sufficiently melted. Then, the melted binder resin is charged into the kneading machine 30 and kneaded so as to reliably coat surfaces of the wood piece and the wood powder. Thereafter, as in the first embodiment, a kneaded material is charged into the drag 31, strongly pressed from upward by the cope 34 set at the press machine 32 and then cooled. When the kneaded material is cured, it is taken out.

Figure 8:
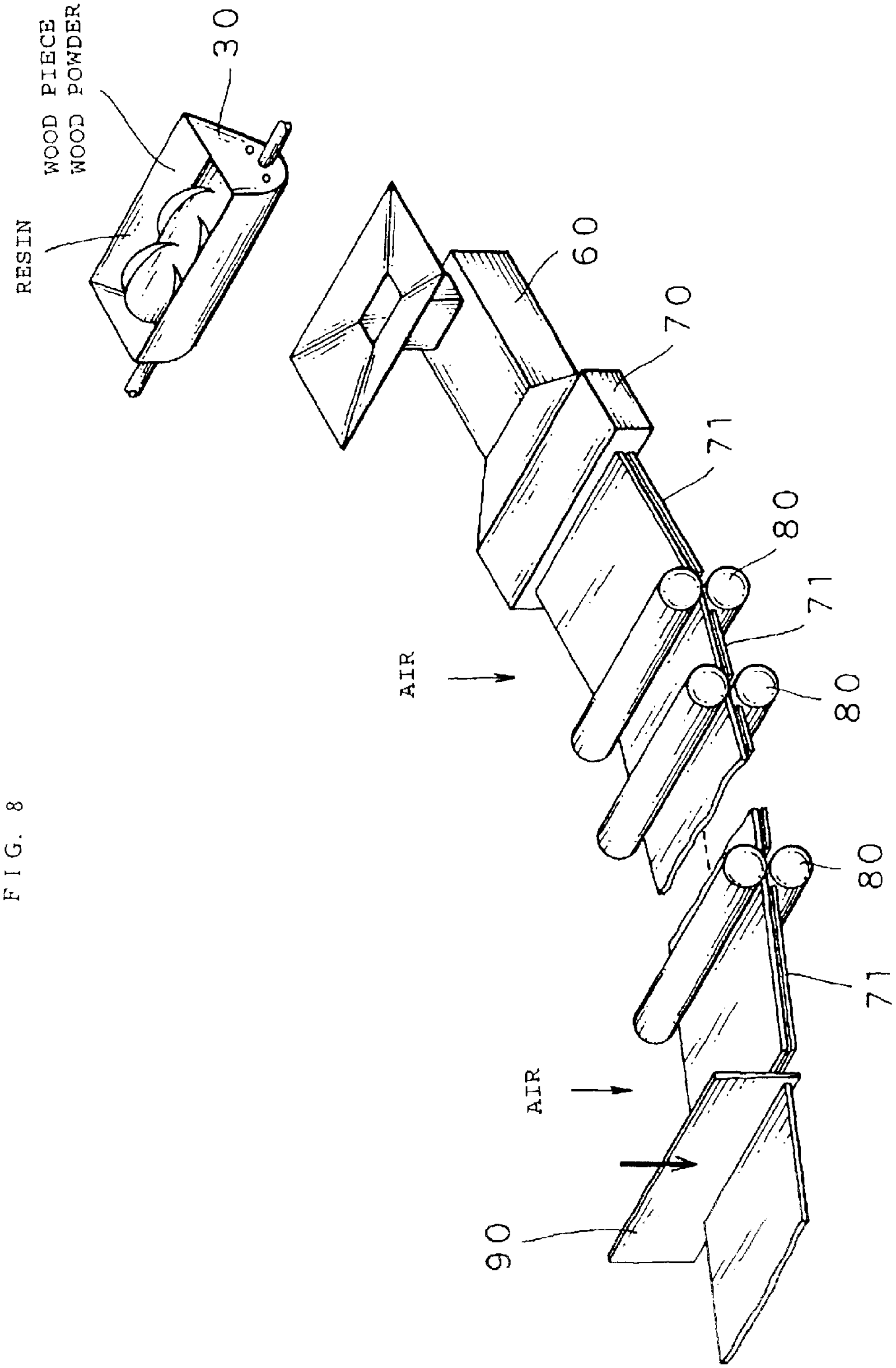
FIG. 8 is a schematic view conceptually showing a manufacturing method of a third embodiment.

FIG. 8 shows a third embodiment. Referring to FIG. 8, the same portions as those of FIGS. 5 and 7 are denoted by the same reference numerals. A biaxial heating and extruding machine 60 is provided in front of the kneading machine 30 (A uniaxial heating and extruding machine may be used). A die 70 is mounted to an extruding opening of the biaxial heating and extruding machine 60. A plurality of receiving plates 71 are provided in front of the die 70 along a longitudinal direction. A plurality pairs of transverse rollers 80 are provided between adjacent receiving plates 71. A cutter 90 is provided in front of the last transverse roller 80.

When a composite wood is manufactured by using a system of this embodiment, chips of the binder resin are charged into the kneading machine 30 and melted. Then, the wood pieces and the wood powder are charged therein at a time or a several times such that the binder resin, the wood pieces and the wood powder are kneaded. At this time, the wood pieces and the wood powder are heated by heat from melted binder resin such that a water content thereof is thoroughly evaporated.

When a kneaded material is thoroughly kneaded, the resultant kneaded material is charged from the kneading machine 30 into an opening of the biaxial heating and extruding machine 60. The kneaded material is conveyed forward while being kneaded by the biaxial heating and extruding machine 60 and extruded from the die 70 in a plate shape. The kneaded material receives a large pressure from its surrounding in the biaxial heating and extruding machine 60 and the die 70. Small cavities of several wood pieces of a plurality of wood pieces at surface sides are deformed so as to be collapsed, so that the binder resin enters into the small cavities.

When the kneaded material is extruded from the die 70 in a plate shape, the kneaded material is conveyed forward on the receiving plates 71. At this time, a cooling air is successively blown for the kneaded material, so that a temperature of the kneaded material is gradually decreased. The plate shaped kneaded material conveyed forward on the receiving plates 71 is repeatedly and strongly pressed by a plurality of transverse rollers 80 in a vertical direction. Thus, the small cavities of wood pieces adjacent to the surface are deformed so as to be collapsed and the binder resin enters into the small cavities. A pressure of the transverse rollers 80 is set so as to be the same as in the first embodiment.

When the plate shaped kneaded material passes the last transverse roller 80, a temperature of the kneaded material is decreased to a predetermined temperature by action of the cooling air. In this way, the plate shaped kneaded material is thoroughly cured and finally cut by the cutter 90 so as to have a predetermined length. As a result, a plate shaped composite wood can be obtained. The last transverse roller 80 may include a heater so as to have a function of smoothing a surface of the plate shaped composite wood.

As the composite wood of this embodiment is extruded from the die 70 and then conveyed forward while pressed in a vertical direction, a plurality of wood pieces are bound together by the binder resin while being aligned in a conveying direction. Accordingly, it is confirmed that the composite wood exhibits high resistance with respect to bending along the conveying direction.

The present invention is not limited to the above-described manufacturing methods and other method may be adapted. For example, a mold corresponding to a shape of product may be used and the product may be molded. Alternatively, pressing may be performed from two directions of three directions, i.e., vertical, transverse and height directions.

An application for the composite wood is not limited to a pallet. The composite wood can be used for other products such as construction materials such as a plywood, construction materials such as a pole, and durable consumer goods such as a core material for furniture and a bench.

What is claimed is:

1. A composite wood comprising a plurality of wood pieces and a binder resin, wherein each of said plurality of wood pieces has a three-dimensional configuration having a plurality of cell walls therein, each of the cell walls having a cavity therein, each of said plurality of wood pieces being substantially surrounded by said binder resin, wherein the cell walls disposed substantially adjacent to perimeters of said wood pieces are deformed and collapsed by said binder resin, and wherein a portion of said binder resin is disposed in the cavities so that said plurality of wood pieces are bound to said binder resin.

2. The composite wood according to claim 1, further comprising a plurality of fine split portions are formed adjacent to a surface of each of the wood pieces, said binder resin enters between said plurality of fine split portions, said plurality of fine split portions are deformed in a direction close disposing them to each other, so that said plurality of wood pieces and the resin binder are strongly bound together.

3. The composite wood according to claim 1, wherein each of said plurality of wood pieces has a size of at least 2 mm when measured by a comb tooth of crushing machine.

4. The composite wood according to claim 3, further comprising wood powder having a maximum size of 2 mm when measured by said comb tooth of said crushing machine and thin pieces of wood having a plurality of cavities that substantially remain only in a two dimensional configuration and said wood powder and said thin pieces of wood are dispersed between said plurality of wood pieces.

5. The composite wood according to claim 1, wherein an amount of said plurality of wood pieces is one to five times larger than an amount of said binder resin in a volume ratio.

6. The composite wood according to claim 1, wherein said binder resin is at least one of polypropylene, polyethylene, polyvinyl chloride and other thermoplastic resins.

7. The composite wood according to claim 1, wherein said plurality of wood pieces include recycled wood.

8. The composite wood according to claim 6, wherein said thermoplastic resin is a resin including a recycled plastic.

9. The composite wood according to claim 6, wherein said plurality of wood pieces and said thermoplastic resin include crushed pieces of used composite wood.

10. The composite wood according to claim 1, wherein the cavity in each of the cell walls is at least one of a cell cavity, a conduit cavity and a capillary cavity.

11. A composite wood comprising a plurality of wood pieces and a binder resin, wherein each of said plurality of wood pieces has a three-dimensional configuration having a plurality of cell walls therein, each of the cell walls having a cavity therein, each of said plurality of wood pieces being substantially surrounded by said binder resin, and wherein at least the cell walls disposed substantially adjacent to perimeters of said wood pieces are deformed and collapsed by said binder resin after being pressed and cooled, and wherein a first portion of said binder resin is disposed in the cavities and a second portion of said resin is disposed outside of the cavities so that said plurality of wood pieces are bound to said binder resin.

12. A composite wood as defined in claim 11, wherein substantially all of the cell walls in said wood pieces are deformed and collapsed by said binder resin after being pressed and cooled.

* * * * *